(12) United States Patent
Hasegawa et al.

(10) Patent No.: US 7,010,184 B2
(45) Date of Patent: Mar. 7, 2006

(54) OPTICAL MODULE

(75) Inventors: Junichi Hasegawa, Tokyo (JP);
Tsunetoshi Saito, Tokyo (JP)

(73) Assignee: The Furukawa Electric Co., Ltd.,
Tokyo (JP)

( * ) Notice: Subject to any disclaimer, the term of this patent is extended or adjusted under 35 U.S.C. 154(b) by 160 days.

(21) Appl. No.: 10/645,542

(22) Filed: Aug. 22, 2003

(65) Prior Publication Data

US 2004/0156577 A1   Aug. 12, 2004

(30) Foreign Application Priority Data

Aug. 23, 2002  (JP)  ............... 2002-243892

(51) Int. Cl.
*G02B 6/12*   (2006.01)
(52) U.S. Cl. ............................................. 385/14
(58) Field of Classification Search .............. 385/4–18, 385/24, 37, 49–50, 88–89, 94; 359/251, 359/283; 257/432–435, 693, 704
See application file for complete search history.

(56) References Cited

U.S. PATENT DOCUMENTS

| | | | | |
|---|---|---|---|---|
| 5,719,978 | A * | 2/1998 | Kakii et al. | 385/89 |
| 6,304,687 | B1 * | 10/2001 | Inoue et al. | 385/14 |
| 6,823,103 | B1 * | 11/2004 | Lam et al. | 385/24 |
| 6,864,553 | B1 * | 3/2005 | Epitaux et al. | 257/433 |
| 2002/0076145 | A1 * | 6/2002 | Lam et al. | 385/24 |
| 2003/0103729 | A1 * | 6/2003 | Ishida | 385/49 |
| 2003/0156789 | A1 * | 8/2003 | Bhardwaj et al. | 385/37 |

* cited by examiner

*Primary Examiner*—Akm Enayet Ullah
(74) *Attorney, Agent, or Firm*—Oblon, Spivak, McClelland, Maier & Neustadt, P.C.

(57) ABSTRACT

An optical module comprising a planar lightwave circuit chip comprising a substrate and a waveguide forming region located on said substrate, a plurality of lids installed along a edge surface at least at one side of the edges of said planar lightwave circuit chip, and an optical fiber array connected to said planar lightwave circuit chip.

9 Claims, 12 Drawing Sheets

OPTICAL MODULE

BACKGROUND OF THE INVENTION

1. Field of the Invention

The present invention relates to an optical module used for optical communication and the like.

2. Related Art

Optical parts which have functions such as optical branching, optical switching, wavelength multiplexing/de-multiplexing and the like has a popularity in the field of optical communication. Even though there are various kinds of optical parts, especially a planar lightwave circuit (PLC) chip which has a waveguide forming region including an optical waveguide circuit on a substrate is in practical use because of its potential possibility of integration and mass production.

A substrate for a planar lightwave circuit chip is, in general, made of silicon, quartz or the like. A waveguide forming region made on the substrate is, in general, made of materials including quartz or the like.

Figure 8:
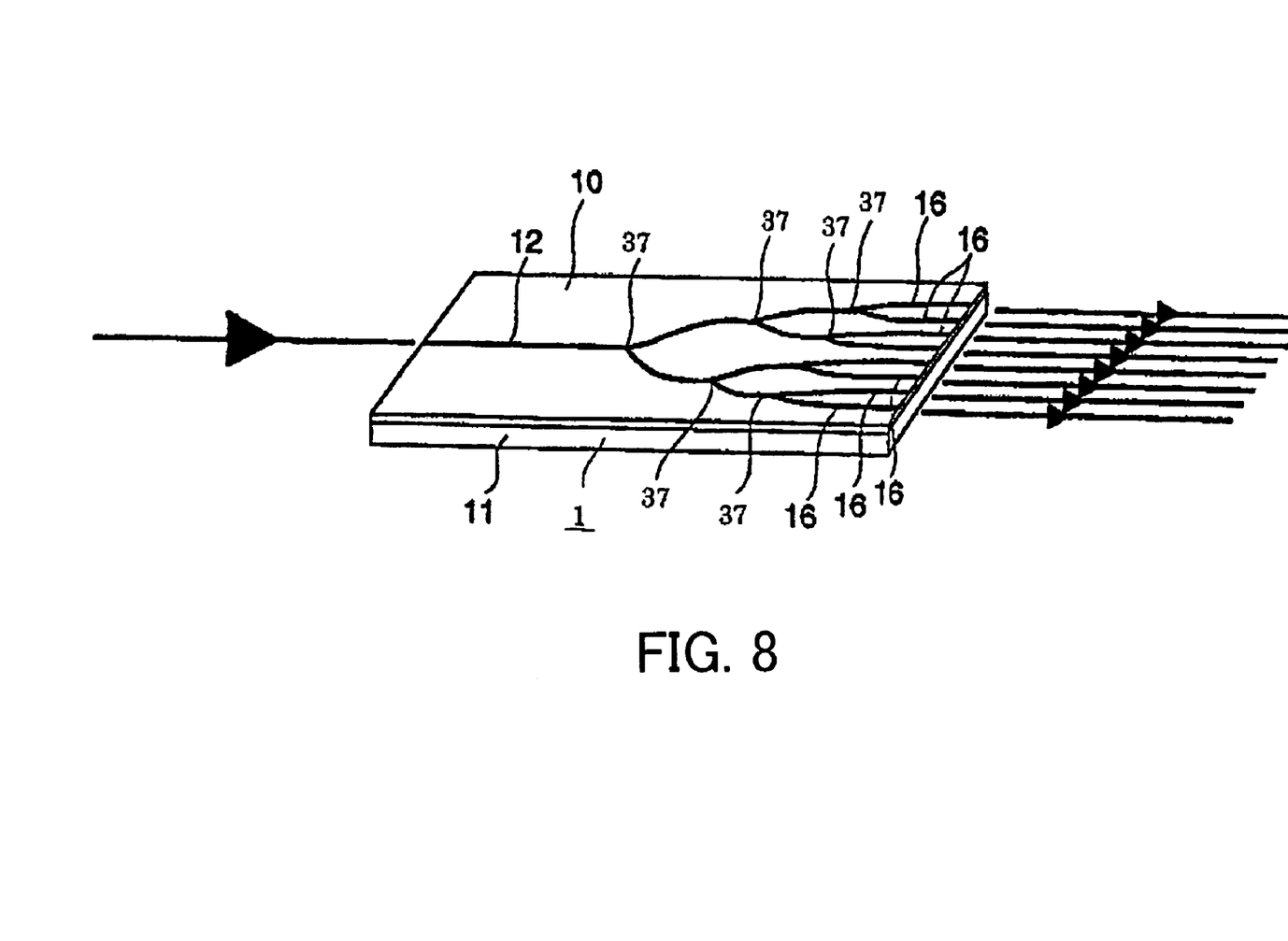
FIG. 8 is a explanation drawing to show one example of the planar lightwave circuit chip with a 1×8 optical waveguide circuit.
Figure 9:
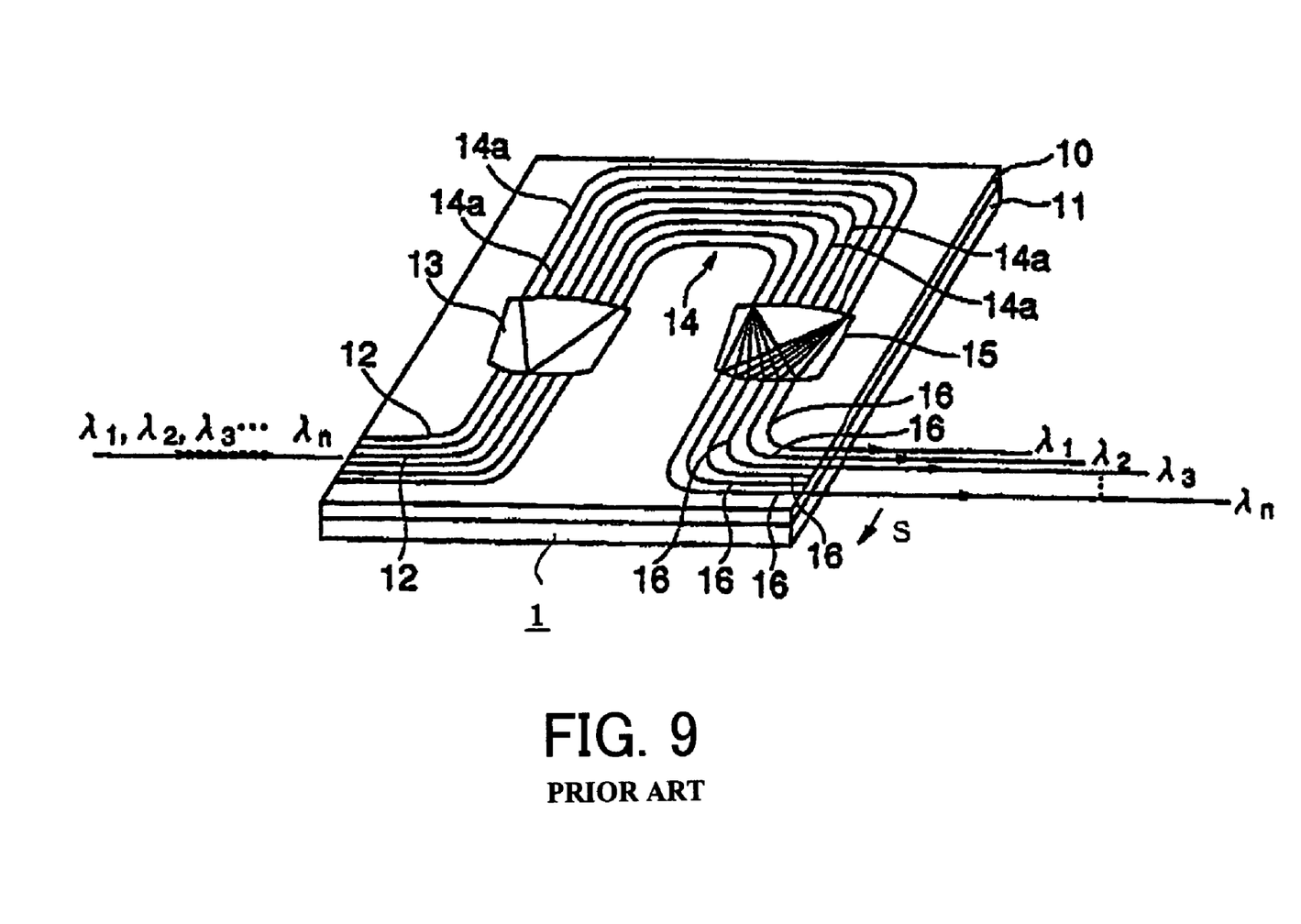
FIG. 9 is a explanation drawing to show one example of the planar lightwave circuit chip with an arrayed waveguide grating.

FIG. 8 and FIG. 9 illustrate an example of the planar lightwave circuit chip. A planar lightwave circuit chip 1 comprises a waveguide forming region 10 with an optical waveguide circuit on a substrate 11 made of silicon.

FIG. 8 illustrates a sample of the planar lightwave circuit chip which makes a 1×8 optical waveguide circuit as a circuit for an optical waveguide. FIG. 9 illustrates a sample of the planar lightwave circuit chip which makes a circuit of an arrayed waveguide grating (AWG) as a circuit for an optical waveguide. The arrayed waveguide grating is used for wavelength multiplexing communication, and various kinds of circuits using the arrayed waveguide grating are proposed.

As shown in FIG. 8, the 1×8 optical waveguide circuit has one optical input waveguide 12 and eight optical output waveguides 16, and a plurality of branching parts 37 between the optical input waveguide 12 and the optical output waveguide 16.

As shown in FIG. 9, the circuit of the arrayed waveguide grating has at least one optical input waveguide 12, a first slab waveguide 13 connected to an output side of the optical input waveguide 12, an arrayed waveguide 14 connected to an output side of the first slab waveguide 13, a second slab waveguide 15 connected to an output side of the arrayed waveguide 14A and plurality of optical output waveguides 16 insatlled in parallel and connected to an output side of the second slab waveguide 15.

The arrayed waveguide 14 transmits a light beam outputted from the first slab waveguide 13, and it includes a plurality of channel waveguides 14A installed in parallel. Length of the adjacent channel waveguides 14A is different by the predetermined length (ΔL).

In general, a lot of (for example, one hundred) channel waveguides 14A composing the arrayed waveguide 14Are installed. For example, the optical output waveguides 16 with number corresponding to the number of optical signals with different wavelength multiplexed or de-multiplexed by the arrayed waveguide grating are installed. In FIG. 9, all of the channel waveguide 14A and optical output waveguide 16 are not illustrated so as to simplify the drawing.

In the circuit of the arrayed waveguide grating, as shown in FIG. 9, when a wavelength multiplexed light beam is inputted into one optical input waveguide 12, the wavelength multiplexed light beam is inputted into the first slab wavelength 13 through the optical input waveguide 12, and inputted into the arrayed waveguide 14 with spreading out by the diffraction effect and transmitted in the arrayed waveguide 14.

The light beam transmitted to the arrayed waveguide 14 reaches the second slab waveguide 15, and then is collected to the optical output wavguide 16 and outputted from the optical output wavguide 16. However, there is difference of phase in each light beam transmitted in each channel waveguide 14A of the arrayed waveguide 14 because length of each channel waveguide 14A is different each other. The wavefront of collected light beam is tilted corresponding to the difference of phase, and position to collect the light beams is determined according to the tilted angle. Therefore light beams with different wavelength can be outputted from the different optical output waveguide 16.

For example, as shown in FIG. 10, the planar lightwave circuit chip 1 which has the circuit of the above-mentioned arrayed waveguide grating and the circuit of the optical branching waveguide is contained in a package 2 and used as an optical module. An optical module means an item where optical fibers are connected to the planar lightwave circuit chip and the flat optical wavelength chip is contained in the package.

Figure 10A:
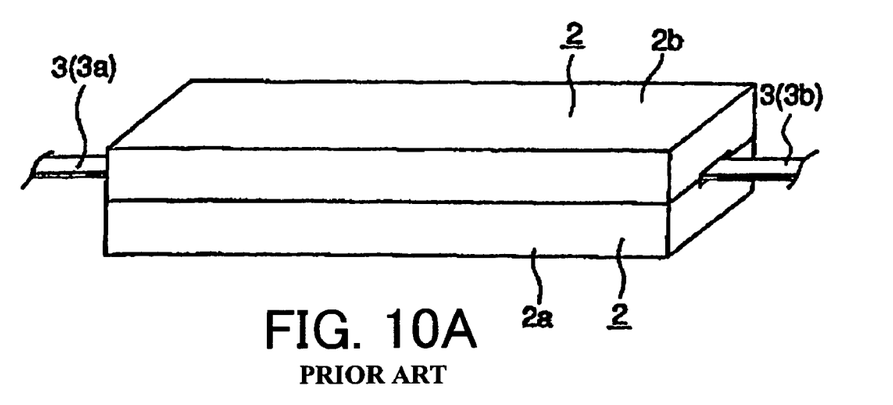
FIG. 10 is a explanation drawing to show an example of the structure of an optical module of the related art.
Figure 10B:
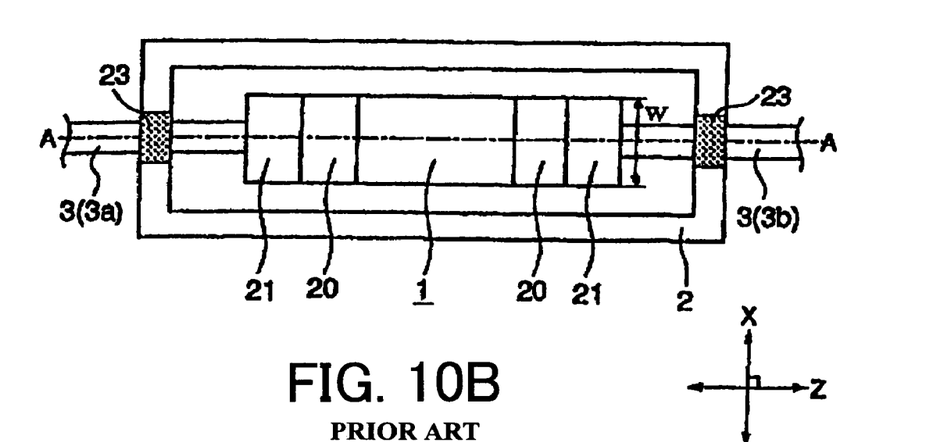
Figure 10C:
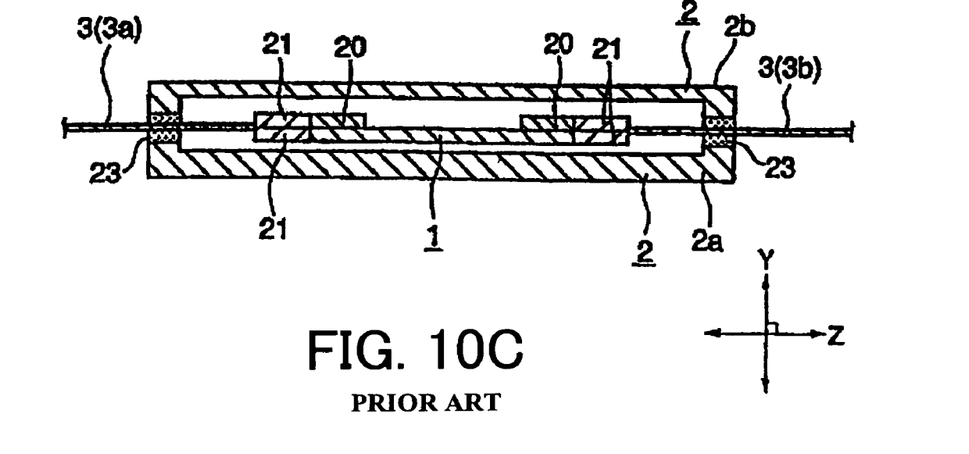

FIG. 10A is a perspective view of the optical module, and FIG. 10B is a perspective view from the top of the optical module, and FIG. 10C is a sectional view A—A in FIG. 10B.

The planar lightwave circuit chip 1 which has planar lightwave circuit circuit such as arrayed waveguide grating and the like has, in general, a small camber because of difference of coefficient of linear thermal expansion between silicon which composes the substrate 11 and quartz which composes the waveguide forming region 10.

For example, as shown in FIG. 11, the planar lightwave circuit chip 1 has a camber with a convexity on the waveguide forming region 10 side. The camber as shown in FIG. 11 is exaggerated so as to understand the explanation easily.

SUMMARY OF THE INVENTION

The first embodiment of the optical module of the present invention is an optical module comprising a planar lightwave circuit chip comprising a substrate and a waveguide forming region located on said substrate, a plurality of lids installed along a edge surface at least at one side of the edges of said planar lightwave circuit chip, an optical fiber array connected to said planar lightwave circuit chip.

The second embodiment of the optical module of the present invention is the optical module, wherein a plurality of lids are installed along each of the opposed edges of the said planar lightwave circuit chip.

The third embodiment of the optical module of the present invention is the optical module, wherein said lids are installed at each four corner of said planar lightwave circuit chip.

The fourth embodiment of the optical module of the present invention is the optical module, wherein said lids are installed and fixed to said planar lightwave circuit chip so that the edge surface of said lids and the edge surface of said planar lightwave circuit chip are on the same plane, and said edge surfaces of said lids and said planar lightwave circuit chip are polished together.

The fifth embodiment of the optical module of the present invention is the optical module, wherein at least one of said plurality of lids is installed on a place where an optical waveguide to which said optical fiber array is connected is formed in said waveguide forming region.

The sixth embodiment of the optical module of the present invention is the optical module, wherein at least one of said plurality of lids is installed on a place where an optical waveguide to which said optical fiber array is connected is formed in said waveguide forming region, and at least one of said plurality of lids is installed on a place where an optical waveguide to which said optical fiber array is connected is not formed in said waveguide forming region The seventh embodiment of the optical module of the present invention is the optical module, wherein a circuit of the optical waveguide located on said waveguide forming region is a circuit of an arrayed waveguide grating.

The eighth embodiment of the optical module of the present invention is the optical module, wherein said two opposed edges of said planar lightwave circuit chip are an edge of an optical input side and an edge of an optical output side, and a plurality of lids are installed with the predetermined distance.

The nineth embodiment of the optical module of the present invention the optical module, further comprising a temperature control apparatus which adjusts temperature of said planar lightwave circuit chip contained in a package.

BRIEF DESCRIPTION OF THE DRAWINGS

FIG. 11 is a explanation drawing to show the condition of a camber of the planar lightwave circuit chip schematically.

DETAILED DESCRIPTION OF PREFERRED EMBODIMENTS

Referring to the attached drawings, various preferred embodiments of the present invention will be explained. The same part number will be used for the part whose part name is the same as that of the related art to avoid repeated explanation or to simplify the explanation.

One purpose of the present invention is to provide a reliable optical module which has high production yield ratio and low variation of insertion loss because of the change of the temperature.

Problems of the related art that the inventor has analyzed will be explained for easy understanding of the present invention.

Figure 13:
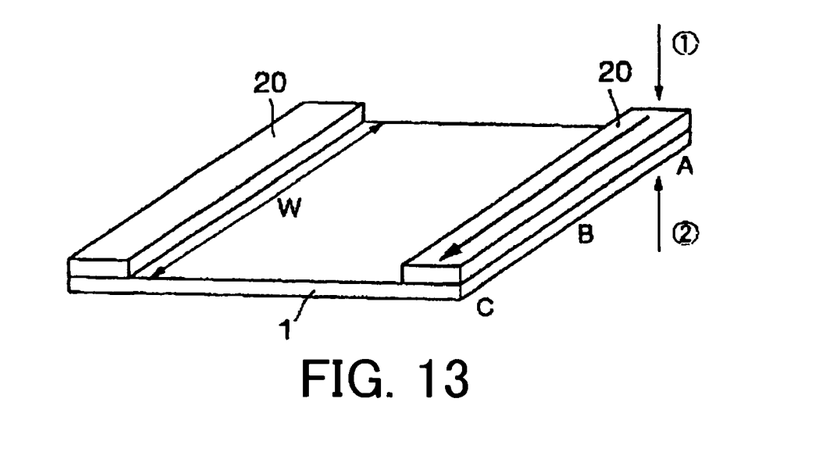
FIG. 13 is a explanation drawing to show measuring method of a camber of the planar lightwave circuit chip and the lid in the related art.

For example, as shown in FIG. 13, the case that a lid 20 which has the same length as width of a planar lightwave circuit chip 1 (28 mm in this embodiment) is installed on the flat optical guidewave chip 1 which has a circuit of an arrayed waveguide grating will be hereinafter explained. The lids are used to cause the connection with the fiber more stable.

Figure 14A:
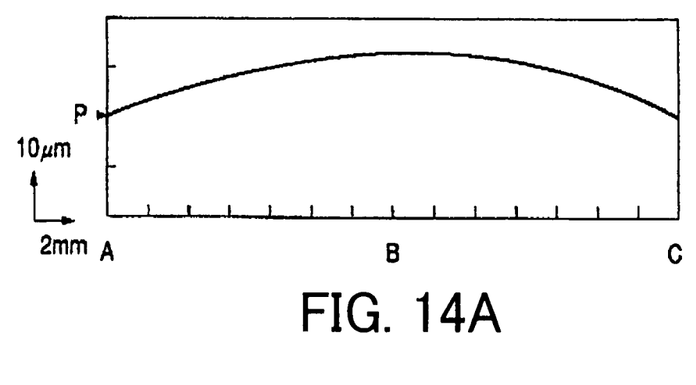
FIG. 14 is a explanation drawing to show an example of measuring result of the camber of the planar lightwave circuit chip and the lid in the related art.
Figure 14B:
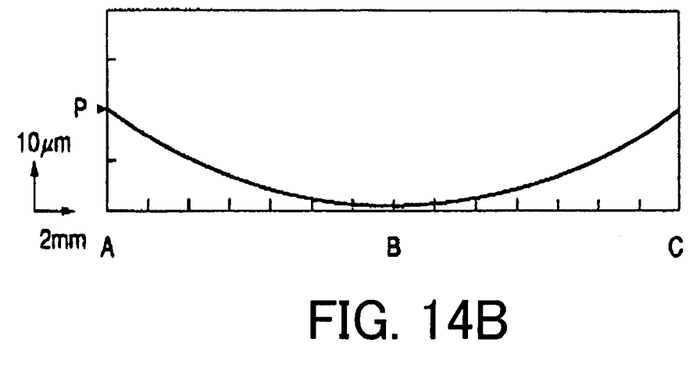

In this case, if height of the camber of the lid 20 and the planar lightwave circuit chip 1 corresponding to the position A, B, C is shown as indicated in FIG. 13, the height of the camber of the lid 20 becomes the figure as shown in FIG. 14A and the height of the camber of the planar lightwave circuit chip 1 becomes the figure as shown in FIG. 14B. Therefore both cambers have large difference.

Figure 12:
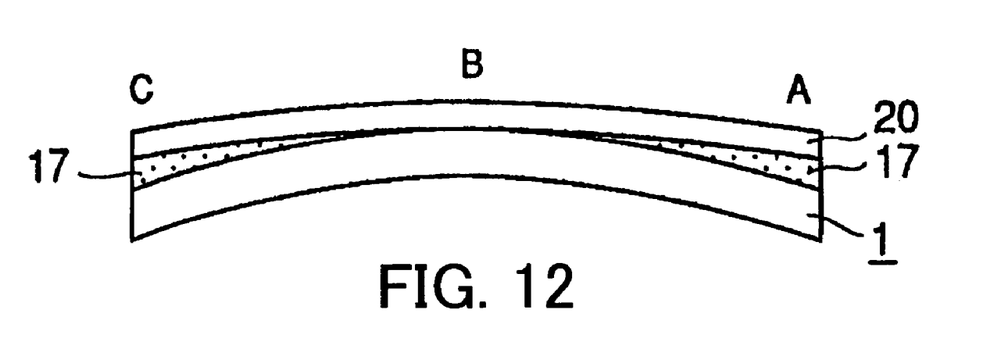
FIG. 12 is a explanation drawing for explaining unevenness of thickness of the adhesive agent located between the planar lightwave circuit chip and the lid according to the camber of the planar lightwave circuit chip.

Though FIG. 13 illustrates the condition that there is no camber of the planar lightwave circuit chip 1 and the lid 20, the planar lightwave circuit chip 1 and the lid 20, as shown in FIG. 12, have a camber to the same direction (having upper convexity). In the measuring data as shown in FIGS. 14A and 14B, the curve of camber of the planar lightwave circuit chip 1 and the curve of camber of the lid 20 are shown in the opposite direction.

Therefore the height of the camber of the lid 20 has the curve with a concavity to upper direction as shown in FIG. 14A when the lid has a camber to upper direction because the camber is measured by the sensor installed on the top side of lid 20 as shown in FIG. 13①. On the other hand, the height of the camber of the planar lightwave circuit chip 1 has the curve with a concavity to lower direction as shown in FIG. 14B when the planar lightwave circuit chip 1 has a camber to upper direction because the camber is measured by the sensor installed on the bottom side of lid 20 as shown in FIG. 13②.

As shown in the above-mentioned data, if there is large difference between the height of the camber of the planar lightwave circuit chip 1 and the lid 20, thickness of an adhesive agent 17 is much varies according to the location. Thickness of the adhesive agent 17 is thin in the center position of the connection part between the planar lightwave circuit chip 1 and the lid 20, and thick in the edge position.

In addition to it, if the lid which has no camber or a small camber is attached to the edge surface of the planar lightwave circuit chip 1, as shown in FIG. 12, it is possible that the adhesive agent to connect the planar lightwave circuit chip 1 and the lid 20 has no uniformity.

If the height of the camber of the planar lightwave circuit chip 1 and the lid 20 is that as shown in FIGS. 14A and 14B, the adhesive agent 17 with thickness of maximum 6 micro meters will be formed in the edge position of the planar lightwave circuit chip 1 and the lid 20.

As mentioned above, if thickness of the adhesive agnet 17 is thick, for example, the adhesive agent 17 will expand or contract according to the change of the using environmental temperature, and therefore the insertion loss of the optical module changes according to the change of the temperature.

Figure 15:
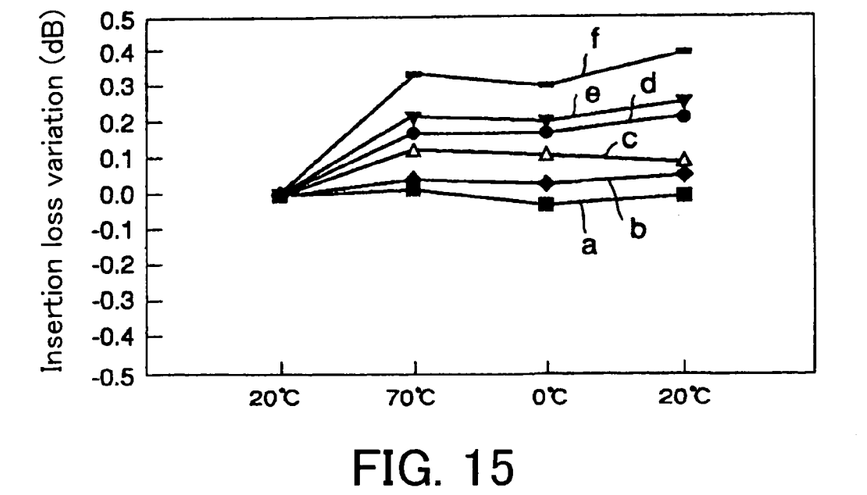
FIG. 15 is a graph for illustrating the change of the insertion loss according to the change of the temperature in the optical module of the related art.

For example, FIG. 15 illustrates the measuring result of the change of the insertion loss of the packaged optical module where an lid 20 which has the same length as width of the planar lightwave circuit chip 1 is installed on the flat optical guidewave chip 1 which has a circuit of the arrayed waveguide grating.

And profile lines from "a" to "f" of FIG. 15 will be hereinafter explained. When a port number is added to the output side of the optical output waveguide 16 from upper side (in other word, a port number is added in the order of the direction shown with the arrow S in FIG. 9) in the circuit of the arrayed waveguide grating, the optical insertion loss of the output light beam from the port number 8 is shown in the profile line "a", and the optical insertion loss of the light beam from port number 16, 24, 32, 40, 48 is shown in the profile line "b, c, d, e, f" respectively.

As shown in the profile lines "a" to "f" in FIG. 15, the insertion loss of the above-mentioned optical module has a large change when the environmental temperature changes from 20 to 70 degree Celsius, from 70 to 0 degree Celsius, and from 0 to 20 degree Celsius. And the optical insertion loss varies according to each output side of the arrayed waveguide grating.

Such variation of the insertion loss tends to be larger if the port number becomes larger. That's because thickness of the adhesive agent becomes thicker when the port number becomes larger. Therefore if thickness of the layer of the adhesive agent 17 becomes thick, the adhesive agent expands or contracts according to the temperature change, and the axis of light beam is shifted, which will cause the insertion loss.

In the case that the circuit of the arrayed waveguide grating is designed so that the center wavelength of the transmission light becomes the predetermined wavelength on the condition that the camber exists considering the above-mentioned camber of the planar lightwave circuit chip, index of refraction of the optical waveguide changes and the center wavelength of the transmission light shifts from the predetermined wavelength if the camber of the planar lightwave circuit chip is corrected by the lid 20 which has the same length as that of the edge surface of the chip.

Figure 16:
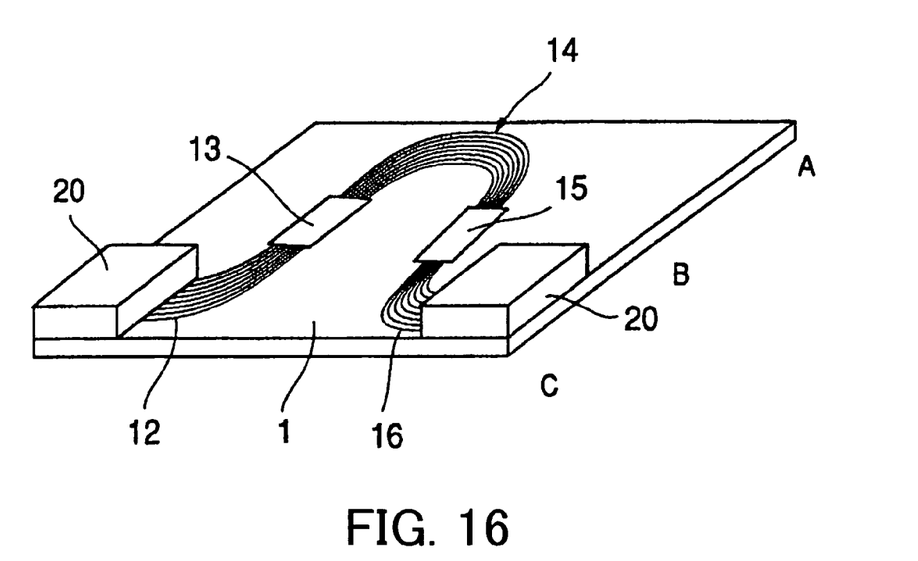
FIG. 16 is a explanation drawing to show an example of the structure that the lid is installed only one side of the edges of the planar lightwave circuit chip.

Therefore, for example, as shown in FIG. 16, it is considered that the lid 20 has the length just enough to cover the optical input waveguide 12 and the optical output waveguide 16. In this case, the possibility that the problem is raised during polishing the edge of the planar lightwave circuit chip 1 is high because the lid 20 is installed only on one of the edges (the area as shown with C in FIG. 16) in the edges of the planar lightwave circuit chip 1.

Figure 17A:
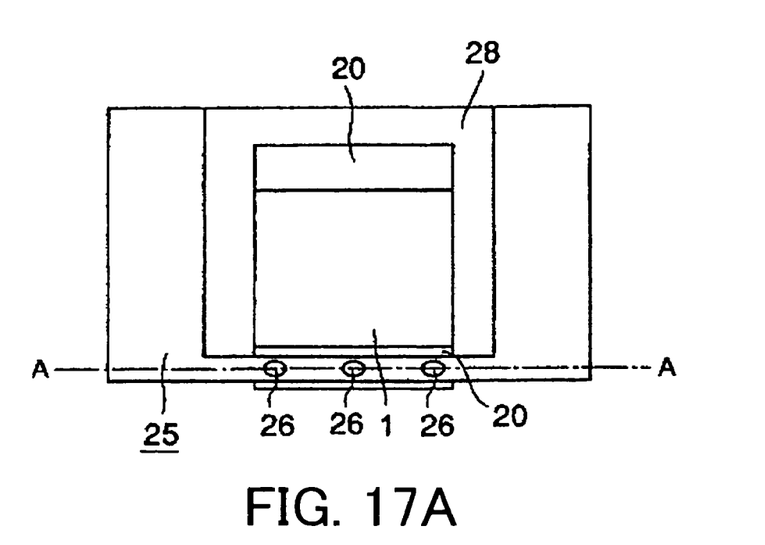
FIG. 17 is a explanation drawing to show the holding condition during polishing the edge of the planar lightwave circuit chip of the related art and the planar lightwave circuit chip shown in the structure of FIG. 16.
Figure 17B:
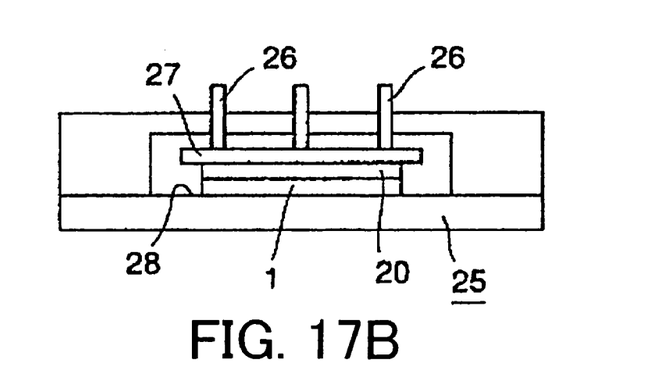

For example, as shown in FIGS. 17A and 17B, one of the edges of the planar lightwave circuit chip 1 is clipped from top and bottom by a base surface 28 of a chip fixing tool 25 applied during polishing the edges of the planar lightwave circuit chip 1 and a chip fixing plate 27 on the condition that the lid 20 is fixed to the chip, and one edge of the planar lightwave circuit chip 1 and lid 20 is polished together.

FIG. 17A is a plane view for illustrating the planar lightwave circuit chip 1 fixed by the chip fixing tool 25 in the case that the lid 20 is installed on the planar lightwave circuit chip 1 of the embodiment as shown in FIG. 13. FIG. 17B is a sectional view of A—A section in FIG. 17A. A part number "26" in the drawing indicates a fixing screw.

Figure 17C:
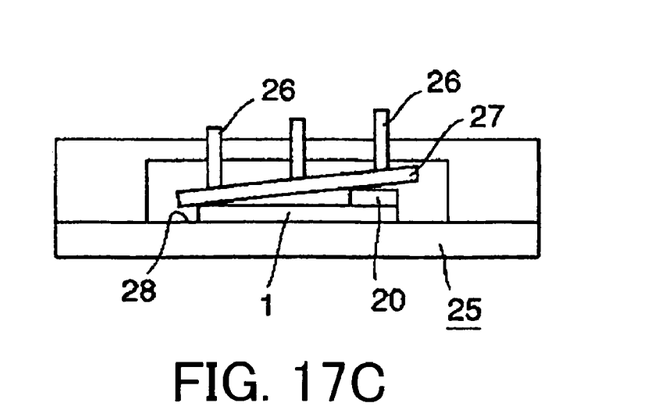

In this case, as shown in FIG. 16, if the lid 20 is installed on only one side of the edges of the planar lightwave circuit chip 1, the planar lightwave circuit chip 1 contacts the chip fixing plate 27 unevenly, therefore, the load is not added evenly to the planar lightwave circuit chip 1 and the lid 20 cannot be fixed stably. FIG. 17C is a sectional view to show the condition that the lid 20 is installed in one side of the edges of the planar lightwave circuit chip 1 and fixed by the chip fixing tool 25 as well as the case shown in FIG. 17B.

Therefore vibration is generated on the planar lightwave circuit chip 1, and the edge of the planar lightwave circuit chip 1 is chipped by the vibration, and in some cases, the planar lightwave circuit chip 1 itself will be cracked. In this case, production yield ratio of the optical module 1 goes down because the planar lightwave circuit chip 1 cannot be produced for commercial use.

Figure 1:
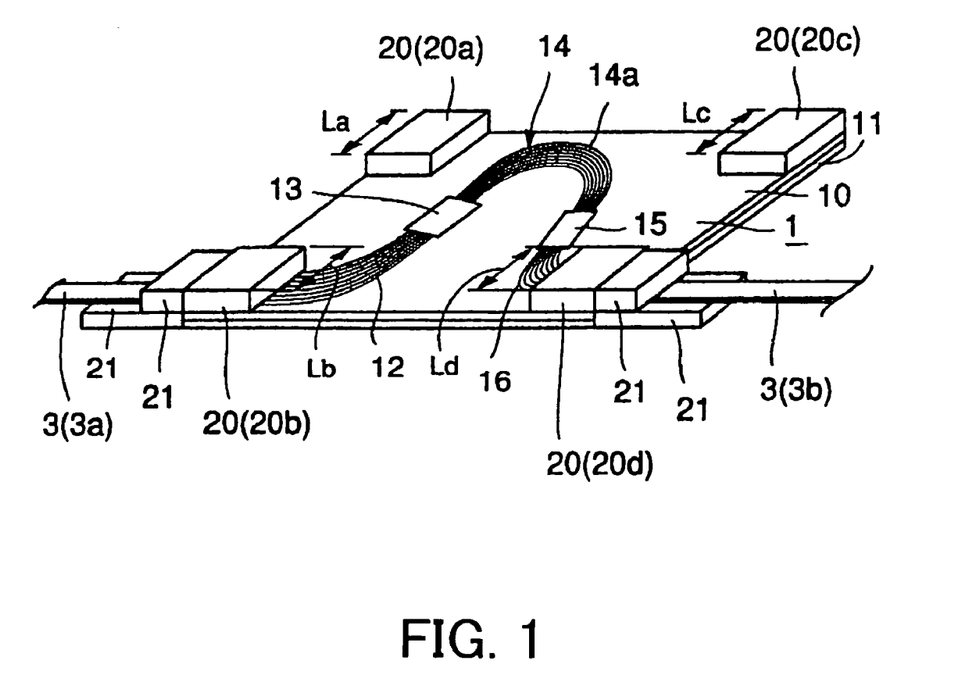
FIG. 1 is a schematic view for illustrating a structure around the planar lightwave circuit chip of one embodiment of the present invention.

FIG. 1 illustrates main elements of one embodiment of the optical module of the present invention. For example, the optical module as shown in FIG. 1 is contained in a package 2, as shown in FIG. 2, for the optical module of the embodiment of the present invention. A temperature control apparatus which is not shown on the drawing is installed in the package 2 to keep the temperature of the planar lightwave circuit chip at the preset temperature.

Figure 2A:
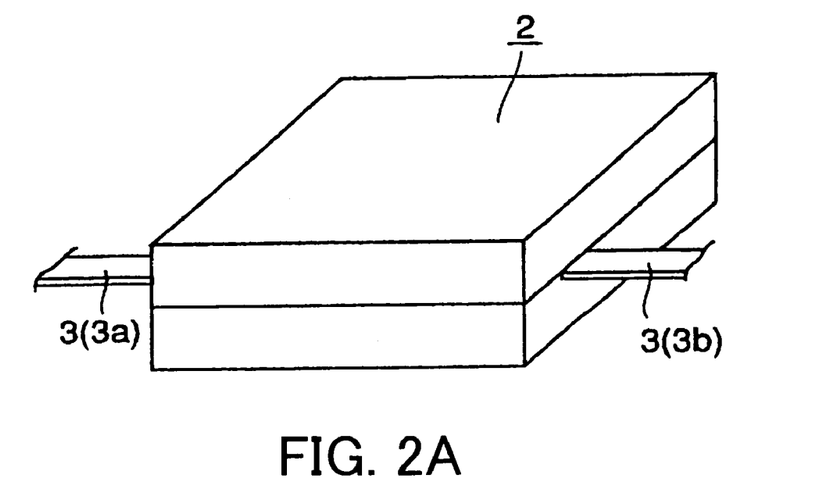
FIG. 2A is a perspective view for illustrating the above-mentioned embodiment.
Figure 2B:
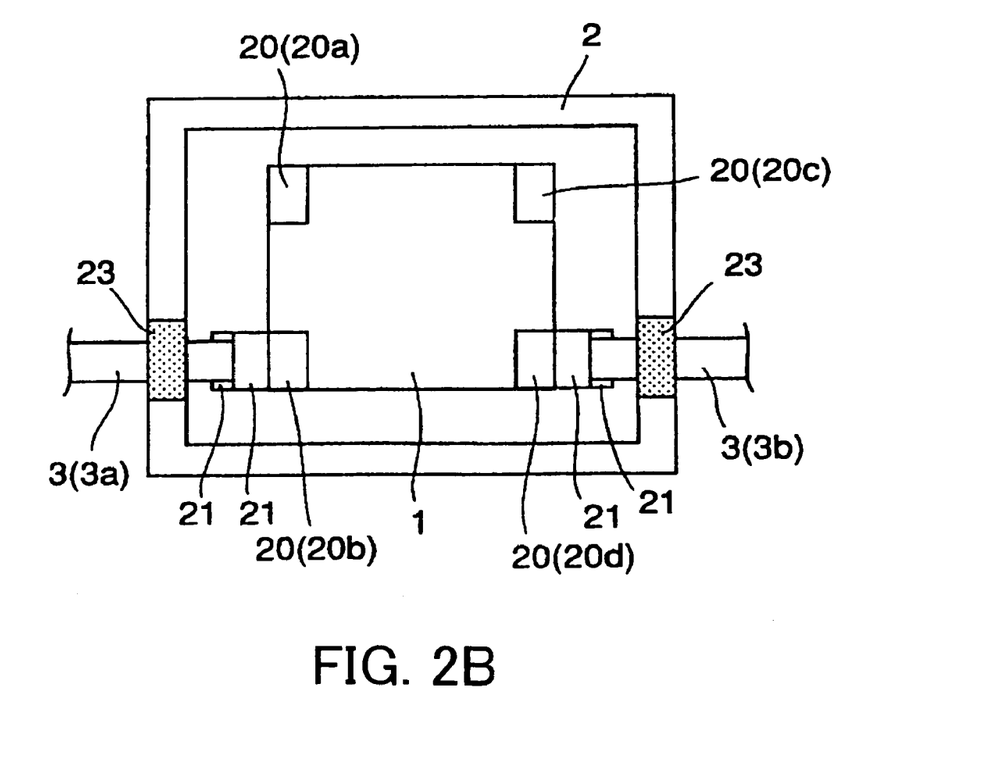
FIG. 2B is a plan view to see through the inside of the optical module from top side.

An optical module as shown in FIG. 2B has an optical fiber 3 (3A) connected to one side of the planar lightwave circuit chip 1 and an optical fiber 3 (3B) connected to the other side of the planar lightwave circuit chip 1. In these optical fibers 3, one end is connected to the planar lightwave circuit chip 1 and the other end is pulled out of the package 2. The optical fibers 3 are connected to the package 2 with the adhesive agent 23.

Each of the optical fiber 3A and 3B, for example, comprises optical fiber tapes where a plurality of optical fibers is laid in parallel, and an optical fiber array 21 is installed in a connecting edge of the optical fiber tapes. The planar lightwave circuit chip 1 and optical fibers 3A and 3B (in other words, between the optical fiber array 21 and the planar lightwave circuit chip 1) are connected by using adhesive agents.

The lid 20 which is made of quartz or the like is connected to the connection edge of the planar lightwave circuit chip 1 with using adhesive agents or the like, and it gives stable connection between the planar lightwave circuit chip 1 and each edge of the optical fiber 3A and 3B. The lid 20 has almost the same length as width of the edge (W) of the planar lightwave circuit chip 1.

The package 2 has a package 2A and a cover 2B. The package 2 is mainly made of metal such as aluminum, stainless steel and the like, or plastics. The package 2 contains the planar lightwave circuit chip 1 and the connecting part of the planar lightwave circuit chip 1 and the optical fibers 3 (3A,3B) inside so as to protect them.

As shown in FIG. 1, this embodiment of the optical module of the present invention includes the planar lightwave circuit chip 1 and the optical fiber array 21 connected to the planar lightwave circuit chip 1. The planar lightwave circuit chip 1 has a waveguide forming region 10 which has the circuit of the arrayed waveguide grating as a circuit of the optical waveguide, and which is made on the substrate 11.

Feature of this embodiment is that a plurality of (2 pieces in this embodiment) lids 20 is installed on the waveguide forming region 10 along the edge surface of the planar lightwave circuit chip 1 at least at one side of the edges of the planar lightwave circuit chip 1, and the lid 20 is fixed to the planar lightwave circuit chip 1 by using adhesive agents. The edge surface of the planar lightwave circuit chip 1 and edge surface of the lid 20 are polished together. The adhesive agent can be used when the lid 20 is fixed to the waveguide forming region 10.

The optical module of this embodiment has four lids 20 (20A, 20B, 20C; 20D), and each lid 20A, 20B, 20C, 20D is installed on each corner of the planar lightwave circuit chip 1 which has a rectangular shape.

The lids 20A and 20B are installed with a certain distance along the edge surface of the optical input side (left side in the drawing) of the planar lightwave circuit chip 1, and the lids 20C and 20D are installed with a certain distance along the edge surface of the optical output side (right side in the drawing) of the planar lightwave circuit chip 1.

In this embodiment, at least one of the above-mentioned lid 20 (the lid 20b and 20d in this case) is installed on the waveguide forming region 10 which has the optical waveguide to which the optical fiber array 21 is connected, and the lid 20d is installed on the optical output waveguide 16 of the arrayed waveguide grating.

Both the length Lb of the lid 20b and the length Ld of the lid 20d is 8 mm. The lid 20b covers an installation area of the above-mentioned optical input waveguide 12 and the lid 20d covers an installation area of the above-mentioned optical output waveguide 16.

And at least one of the lids (the lid 20a and 20c in this case) is installed on the waveguide forming region 10 to which the optical fiber array 21 is not connected. The length La and Lc of the lid 20a and 20c is 8 mm respectively, and this length is the same as the length Lb and Ld of the lid 20b and 20d.

Figure 3:
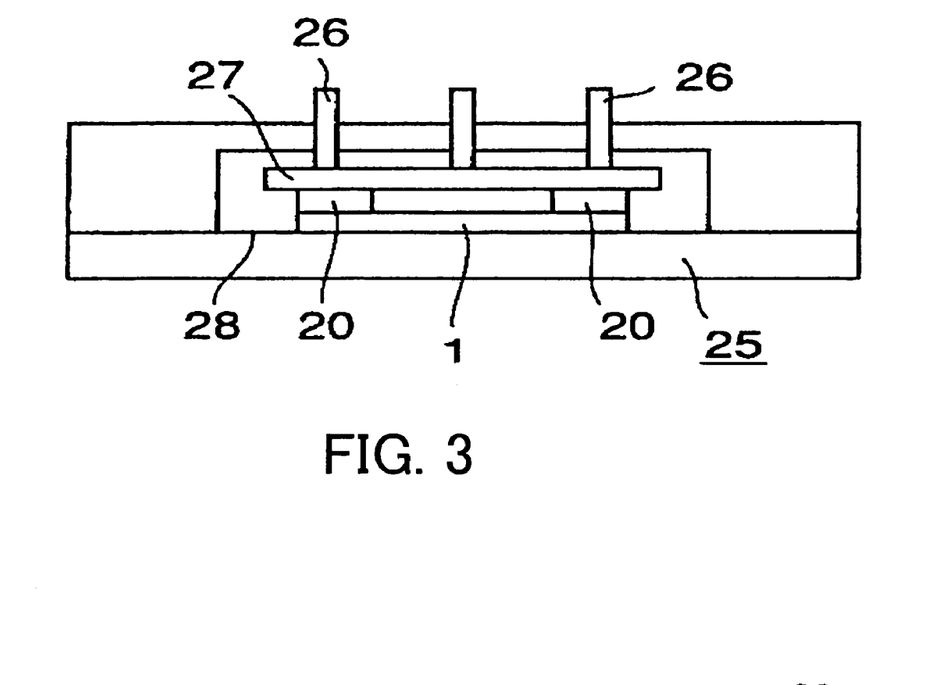
FIG. 3 is a explanation drawing to show the holding condition during polishing edges of the planar lightwave circuit chip in the above-mentioned optical module.

The edge surface of the planar lightwave circuit chip 1 and the edge surface of the lid 20 are polished together, as shown in FIG. 3, on the condition that the lid 20 is fixed to the planar lightwave circuit chip 1 with using the adhesive agent and the planar lightwave circuit chip 1 and the lid 20 are fixed by the chip fixing tool 25. FIG. 3 is a sectional view for illustrating the planar lightwave circuit chip 1 and the lid 20 fixed by the chip fixing tool 25.

In this embodiment, as shown in FIG. 3, if one side of the edges of the planar lightwave circuit chip 1 is held from top and bottom with a datum surface 28 of the chip fixing tool 25 and the chip fixing plate 27, the planar lightwave circuit chip 1 is fixed stably by the chip fixing tool 25 because two each of the lids 20 are installed along the edge surface of the planar lightwave circuit chip 1 at both edge sides of the planar lightwave circuit chip 1.

The edge of the planar lightwave circuit chip 1 is not chipped away, or the planar lightwave circuit chip 1 is not cracked because the edge surfaces of the flat optical wavguide chip 1 and the lid 20 are polished together on the above-mentioned condition. Therefore the above-mentioned edge polishing is performed with high production yield ratio.

In this embodiment, even if the planar lightwave circuit chip 1 has a camber, it is possible to prevent large unevenness of thickness of the adhesive agent 17 located between the planar lightwave circuit chip 1 and the lid 20 because the lids are installed at both edge area of the planar lightwave circuit chip 1 with a certain distance respectively at both edge sides of the planar lightwave circuit chip 1.

It is possible to make thickness of the adhesive agent 17 located between the planar lightwave circuit chip 1 and the lid 20 almost even and thin because the lid 20 can take along the planar lightwave circuit chip 1 according to the camber of the planar lightwave circuit chip 1. As a result, as shown in FIGS. 5A and 5B, the height of the camber of the lid 20 and the planar lightwave circuit chip 1 is almost the same at the installation area of the lid 20.

Figure 4:
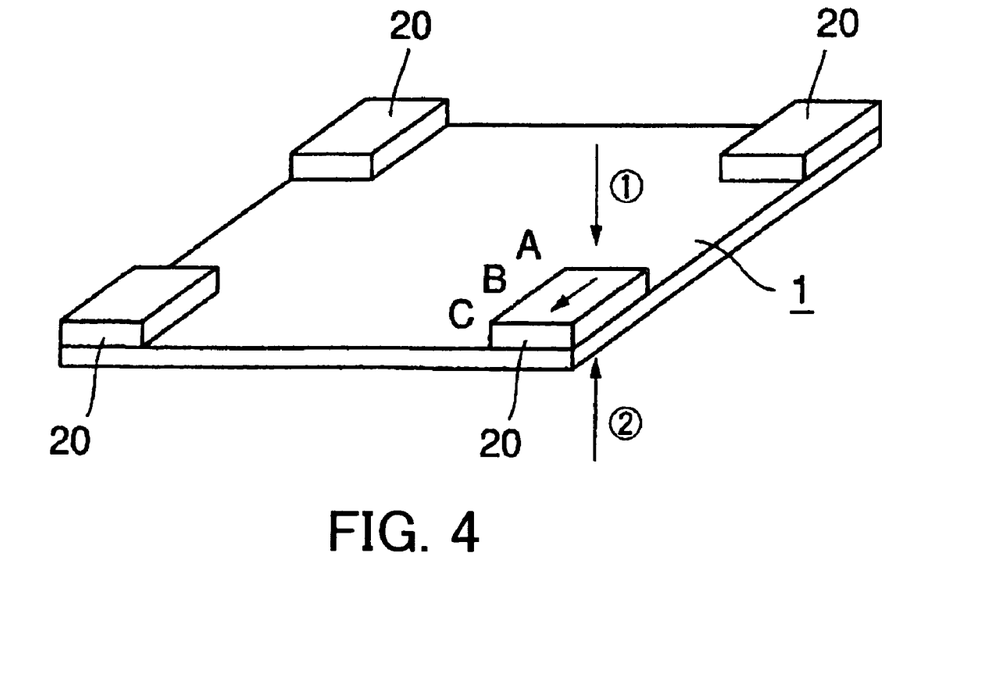
FIG. 4 is a explanation drawing to show the method for measuring a camber of the planar lightwave circuit chip and the lid in the above-mentioned optical module.
Figure 5A:
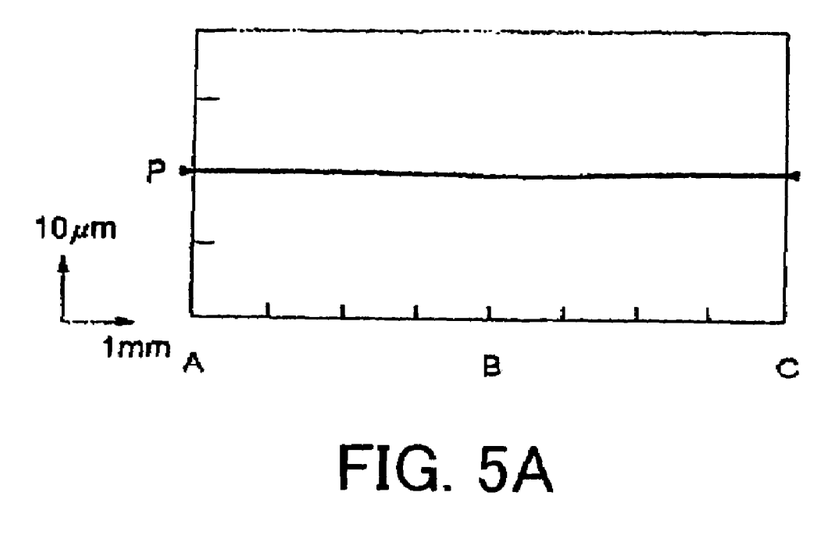
FIG. 5 is a explanation drawing to show the measuring result of a camber of the planar lightwave circuit chip and the lid in the above-mentioned optical module.
Figure 5B:
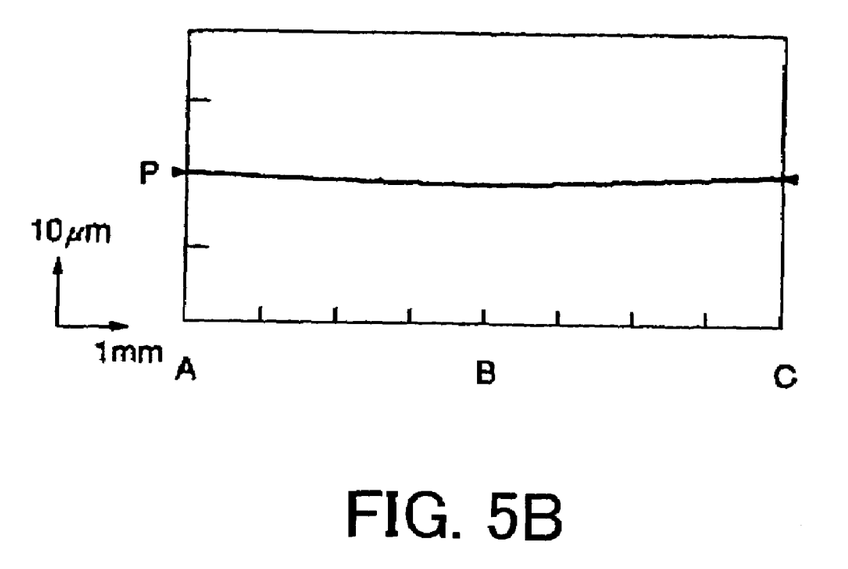

A graph of FIG. 5A illustrates the measuring result of the camber of the lid 20, as shown in FIG. 4①, measured by a measuring device located on the top surface of the lid 20 (not shown on the drawing), and a graph of FIG. 5B illustrates the measuring result for the camber of the lid 20, as shown in FIG. 4②, measured by a measuring device (not shown on the drawing) located on the bottom surface of the planar lightwave circuit chip 1.

Figure 6:
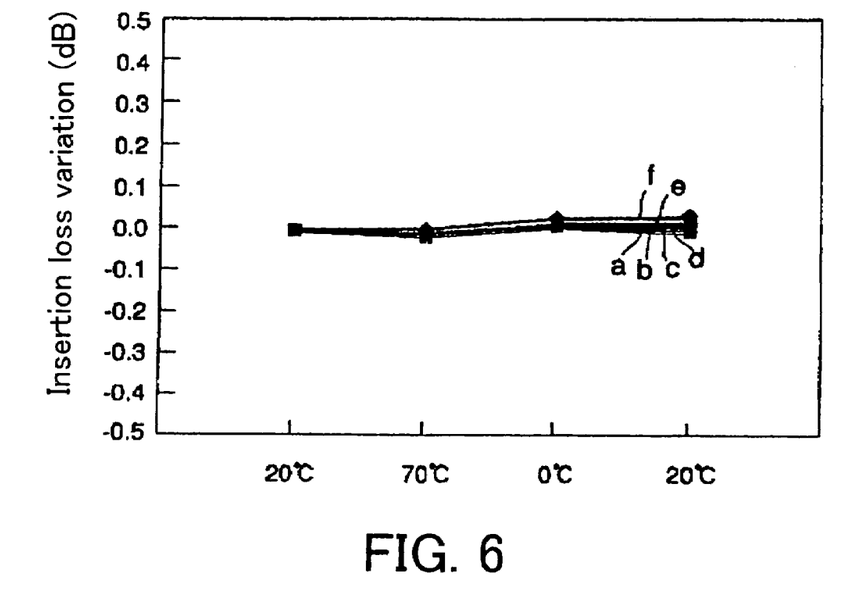
FIG. 6 is a graph for illustrating the change of insertion loss according to the change of the temperature in the above-mentioned optical module.

In this embodiment, the insertion loss of the optical module hardly change according to the change of the temperature by large expansion or contraction of the adhesive agent 17 according to the change of the environmental temperature because thickness of the adhesive agent 17 located between the planar lightwave circuit chip 1 and the lid 20 is even and thin. As shown in FIG. 6, for example, a reliable optical module where the insertion loss dose not change according to the change of the environmental temperature can be provided.

Profile lines "a" to "f" of FIG. 6 will be hereinafter explained. When a port number is added to the output side of the optical output waveguide 16 from upper side (in other word, a port number is added in the order of the direction shown with the arrow S in FIG. 9) in the circuit of the arrayed waveguide grating, optical insertion loss of the output light beam from the port number 8 is shown in the profile line "a", and optical insertion loss of the light beam from port number 16, 24, 32, 40, 48 is shown in the profile line "b, c, d, e, f" respectively. And the insertion loss of the optical module shown in the profile line is the result when the environmental temperature changes from 20 to 70 degree Celsius, from 70 to 0 degree Celsius, and from 0 to 20 degree Celsius.

In this embodiment, as mentioned above, even though the planar lightwave circuit chip 1 has a temperature control apparatus, the edge portion of the planar lightwave circuit chip 1 (connecting surface of the planar lightwave circuit chip 1 and the optical fiber array 21) might be a little bit effected by the change of the environmental temperature because the temperature control apparatus is, for example, installed in the center of the planar lightwave circuit chip 1.

However, in this embodiment, even if the edge portion of the planar lightwave circuit chip 1 is affected by the environmental temperature that the optical module is used, the adhesive agent 17 does not expand or contract a lot according to the environmental temperature, and a reliable optical module with no insertion loss change can be provided.

In addition to it, in the optical module of this embodiment, it is possible to provide the optical module which can multiplex or de-multiplex light beams at almost design center wavelength of transmission light beam without any change of the center wavelength of the transmission light beam as mentioned above.

The present invention is not limited to the above-mentioned embodiment, and other various kinds of embodiments can be taken in the present invention. For example, though the lids 20 are located at four corners of the planar lightwave circuit chip 1 with rectangular shape respectively, it is allowable that a plurality of the lids 20 are installed in the waveguide forming region along the edge surface of the planar lightwave circuit chip 1 at least at one side of the edges of the planar lightwave circuit chip 1.

The planar lightwave circuit chip 1 is fixed stably without uneven contact with the chip fixing tool 25 by arranging a plural of the lids 20 along the edge surface of the planar lightwave circuit chip 1.

Figure 7:
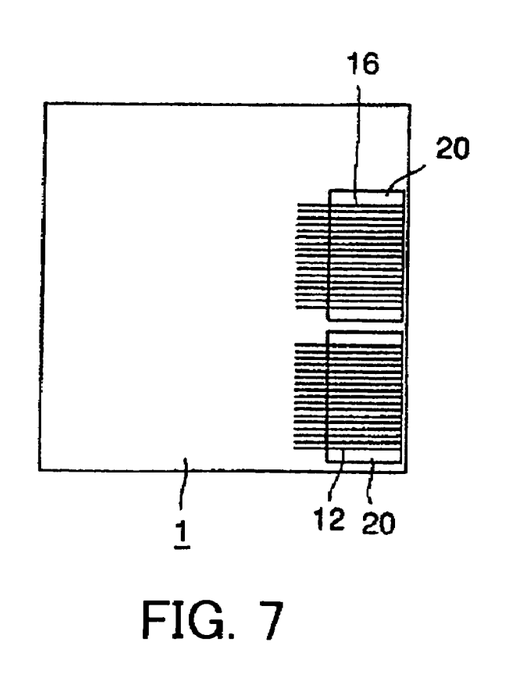
FIG. 7 is a explanation drawing to show arrangement of the planar lightwave circuit chip and the lid schematically in a plan view in another embodiment of the optical module of the present invention.

For example, as shown in FIG. 7, it is also possible to install two lids 20 at one side of the edges of the planar lightwave circuit chip 1 and install both lids 20 on the optical waveguide to which the optical fiber arrays 21 (the optical input waveguide 12 and the optical output waveguide 16 in this case) are connected respectively.

In addition to it, though two each of the lids 20 are installed with a certain distance at one side and the other side of the edges of the planar lightwave circuit chip 1, the lids 20 located at least one of the both sides can be installed without any distance, or number of the lids 20 can become three or more.

Furthermore, though the circuit of the optical waveguide of the planar lightwave circuit chip 1 is the circuit of the arrayed waveguide grating in this embodiment, the circuit of the optical waveguide is not limited to the circuit of the arrayed waveguide grating, and for example, as shown in FIG. 8, it can be a circuit of an optical branching waveguide or other kinds of circuits.

Furthermore, a fixing structure to fix the planar lightwave circuit chip 1 to the elements of the package 2 and the package 2 is not limited to the structure as shown in FIGS. 2A and 2B, and other suitable structure can be applicable according to the condition.

Furthermore, though a shape of the planar lightwave circuit chip 1 is rectangular in the above-mentioned embodiment, the shape of the planar lightwave circuit chip 1 is not limited to rectangular, but the suitable shape can be determined according to the application condition.

According to the present invention, it is possible to fix the planar lightwave circuit chip stably to a polishing tool and to prevent chipping or cracks of the planar lightwave circuit chip when the planar lightwave circuit chip and the lid are polished together because a plurality of the lid is fixed on the waveguide forming region along the edge surface of the planar lightwave circuit chip at least at one side of the edges of the planar lightwave circuit chip with using the adhesive agent.

According to the present invention, as mentioned above, even though, for example, the planar lightwave circuit chip has a camber, it is possible to prevent large uneven thickness of the adhesive agent located between the planar lightwave circuit chip and the lid caused by the camber by fixing a plurality of lids to the waveguide forming region along the edge surface of the planar lightwave circuit at least at one side of the edges of the planar lightwave circuit chip with using the adhesive agent.

Therefore in the optical module of the present invention, it is possible to prevent large expansion or contraction of the adhesive agent located between the above-mentioned planar lightwave circuit chip and the lid according to the change of the environmental temperature where the optical module is used, and therefore it is possible to provide the reliable optical module where the insertion loss of the optical module does not change according to the temperature change.

In addition to it, in the present invention, it is possible to properly keep the strength of the contact point between the optical fiber located on the optical fiber array and the optical waveguide of the planar lightwave circuit chip, and to keep good contact condition according to the structure that at least one lid is installed on the waveguide forming region which has the optical waveguide to which the optical fiber array is connected.

Furthermore, in the present invention, for example, it is possible to fix the planar lightwave circuit chip and the lid to the polishing tool stably when the planar lightwave circuit chip and the lid are polished together according to the structure at least one lid is installed on the waveguide forming region to which the optical fiber array is not connected.

Furthermore, in the present invention, for example, it is possible to fix the planar lightwave circuit chip and the lid to the polishing tool stably when the planar lightwave circuit chip and the lid are polished together and to prevent increase of the insertion loss caused by the camber according to the structure that the lid is installed respectively at four corners of the planar lightwave circuit chip which has a rectangular shape.

Furthermore, it is possible to provide the optical module which has excellent profile for optical multiplexing and de-multiplexing and the above-mentioned effects according to the structure that the circuit of the optical waveguide is the arrayed waveguide grating.

In the present invention, it is possible to provide the reliable optical module which has high yield ratio for production of the optical module and small change of the insertion loss according to the change of the temperature.

What is claimed is:

1. An optical module comprising;
   a planar lightwave circuit chip comprising a substrate and a waveguide forming region located on said substrate,
   a plurality of lids installed along an edge surface at least at one side of the edges of said planar lightwave circuit chip, and
   an optical fiber array connected to said planar lightwave circuit chip.

2. The optical module according to claim 1, wherein a plurality of lids are installed along each of the opposed edges of the said planar lightwave circuit chip.

3. The optical module according to claim 2 wherein said lids are installed at each four corner of said planar lightwave circuit chip.

4. The optical module according to claim 2 or 3, wherein said lids are installed and fixed to said planar lightwave circuit chip so that the edge surface of said lids and the edge surface of said planar lightwave circuit chip are on the same plane, and said edge surfaces of said lids and said planar lightwave circuit chip are polished together.

5. The optical module according to claim 1 or 2, wherein at least one of said plurality of lids is installed on a place where an optical waveguide to which said optical fiber array is connected is installed in said waveguide forming region.

6. The optical module according to claim 1 or 2, wherein at least one of said plurality of lids is installed on a place where an optical waveguide to which said optical fiber array is connected is installed in said waveguide forming region, and at least one of said plurality of lids is installed on a place where an optical waveguide to which said optical fiber array is connected is not installed in said waveguide forming region.

7. The optical module according to claim 1 or 2, wherein a circuit of the optical waveguide located on said waveguide forming region is a circuit of an arrayed waveguide grating.

8. The optical module according to claim 2, wherein said two opposed edges of said planar lightwave circuit chip are an edge of an optical input side and an edge of an optical output side, and a plurality of lids are installed with the predetermined distance.

9. The optical module according to claim 8, further comprising a temperature control apparatus which adjusts temperature of said planar lightwave circuit chip contained in a package.

* * * * *